(12) United States Patent
Kim et al.

(10) Patent No.: US 12,257,934 B2
(45) Date of Patent: Mar. 25, 2025

(54) SEATBACK-FOLDING DEVICE FOR EMERGENCY ESCAPE FOR VEHICLES

(71) Applicant: HYUNDAI TRANSYS INC., Seosan-si (KR)

(72) Inventors: Sang Min Kim, Hwaseong-si (KR); Jung Bin Lee, Hwaseong-si (KR); Byung Mo Kim, Suwon-si (KR); Jun Kyu Kim, Hwaseong-si (KR); Jae Sung Lee, Pyeongtaek-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 166 days.

(21) Appl. No.: 18/219,112

(22) Filed: Jul. 7, 2023

(65) Prior Publication Data
US 2024/0025308 A1 Jan. 25, 2024

(30) Foreign Application Priority Data
Jul. 20, 2022 (KR) .................. 10-2022-0089303

(51) Int. Cl.
*B60N 2/20* (2006.01)
*B60N 2/235* (2006.01)
*B60N 2/68* (2006.01)

(52) U.S. Cl.
CPC .............. *B60N 2/20* (2013.01); *B60N 2/206* (2013.01); *B60N 2/2352* (2013.01); *B60N 2/68* (2013.01)

(58) Field of Classification Search
CPC ...... B60N 2/2236; B60N 2/206; B60N 2/232; B60N 2/2354; B60N 2/2358; B60N 2/235; B60N 2/2352
See application file for complete search history.

(56) References Cited

U.S. PATENT DOCUMENTS

2015/0329014 A1* 11/2015 Elton .................. B60N 2/20
  297/378.12
2022/0332224 A1* 10/2022 Lee .................... B60N 2/2358
(Continued)

FOREIGN PATENT DOCUMENTS

| DE | 10313807 A1 * | 9/2004 | ............ B60N 2/206 |
| DE | 102005011210 A1 * | 9/2006 | ............ B60N 2/206 |
| DE | 102005043941 A1 * | 4/2007 | ............ B60N 2/206 |

(Continued)

OTHER PUBLICATIONS

Request for the Submission of an Opinion in Korean Patent Application No. 10-2022-0089303, dated Nov. 28, 2023.

*Primary Examiner* — Timothy J Brindley
(74) *Attorney, Agent, or Firm* — Quantum Patent Law Firm; Seongyoune Kang (57) ABSTRACT

A seatback-folding device for emergency escape for vehicles is equipped with a simply structured mechanism for emergency escape. A locking operation at the time of unfolding of a seatback of a second-row seat and an unlocking operation at the time of folding of the seatback of the second-row seat are performed by ascending/descending of a shaft caused by operation of a lever, thereby not only enabling an occupant sitting on a third-row seat to quickly fold the seatback of the second-row seat and thus to easily secure an emergency escape route, but also reducing the number of components, weight, the number of assembly processes, and manufacturing cost compared to a related art.

15 Claims, 10 Drawing Sheets

(56) References Cited

U.S. PATENT DOCUMENTS

2024/0051437 A1* 2/2024 Kim .................. B60N 2/20
2024/0190307 A1* 6/2024 Choi ................ B60N 2/2227

FOREIGN PATENT DOCUMENTS

| EP | 2184201 A1 * | 5/2010 | ............. B60N 2/206 |
| FR | 2467102 A1 * | 4/1981 | |
| FR | 2915934 A1 * | 11/2008 | ............... B60N 2/20 |
| KR | 10-1998-0056649 A | 9/1998 | |
| KR | 10-0655989 B1 | 12/2006 | |
| KR | 10-0803067 B1 | 2/2008 | |
| KR | 20130024618 A * | 3/2013 | |
| KR | 20240022737 A * | 2/2024 | |
| WO | WO-2014154549 A1 * | 10/2014 | ................ B60N 2/12 |
| WO | WO-2016009877 A1 * | 1/2016 | ............. A47C 1/025 |

* cited by examiner

SEATBACK-FOLDING DEVICE FOR EMERGENCY ESCAPE FOR VEHICLES

CROSS-REFERENCE TO RELATED APPLICATION

This application under 35 U.S.C. § 119(a) claims priority to Korean Patent Application No. 10-2022-0089303, filed on Jul. 20, 2022, the entire contents of which are incorporated herein by reference.

BACKGROUND

(a) Technical Field

The present disclosure relates to a seatback-folding device for emergency escape for vehicles. More particularly, it relates to a seatback-folding device for emergency escape for vehicles, which enables an occupant sitting on a rear seat to easily fold a seatback of a front seat merely by manipulating a lever in order to secure an emergency escape route.

(b) Background Art

In general, in the case of a vehicle equipped with three or more rows of seats, in the event of an emergency, occupants sitting on the first-row seat and the second-row seat may escape from the vehicle by opening a front door and a rear door, but an occupant sitting on the third-row seat may not secure an escape route quickly due to the seatback of the second-row seat.

Therefore, a seatback-folding mechanism for folding a seatback of a second-row seat is applied to vehicles in order to enable an occupant sitting on a third-row seat to secure an emergency escape route.

Figure 1:
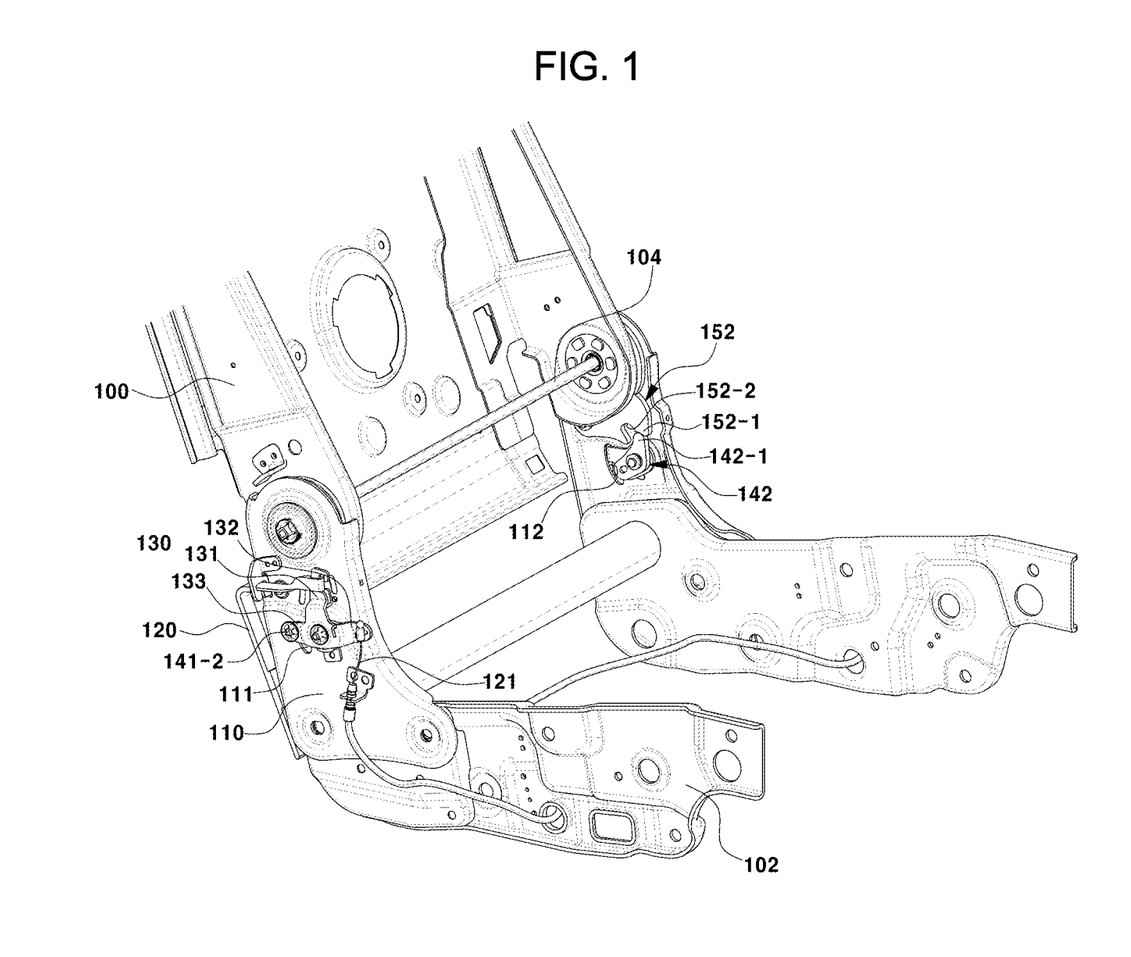
FIGS. 1 and 2 are perspective views showing the external appearance of a conventional seatback-folding mechanism for emergency escape.
Figure 2:
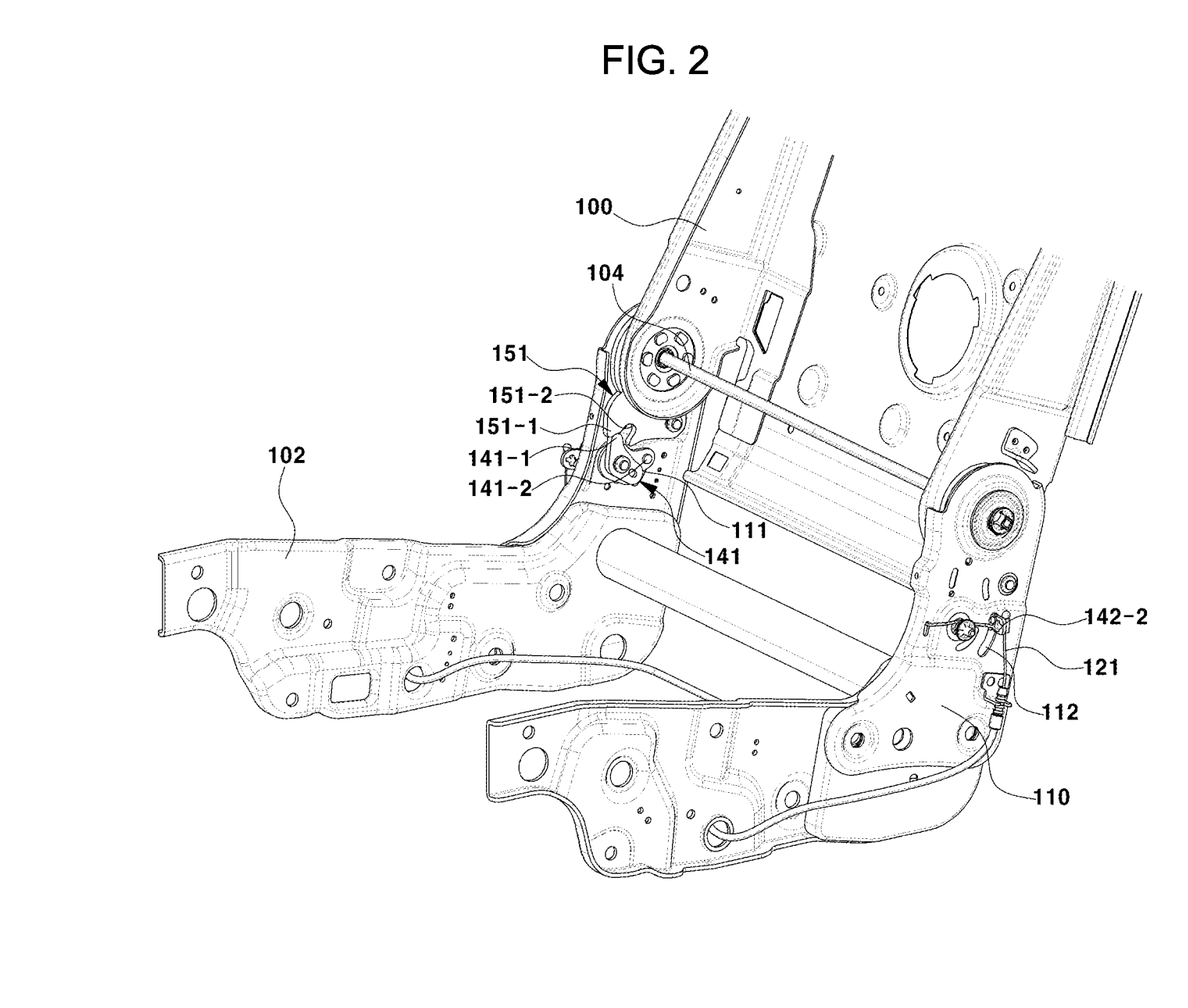
Figure 3:
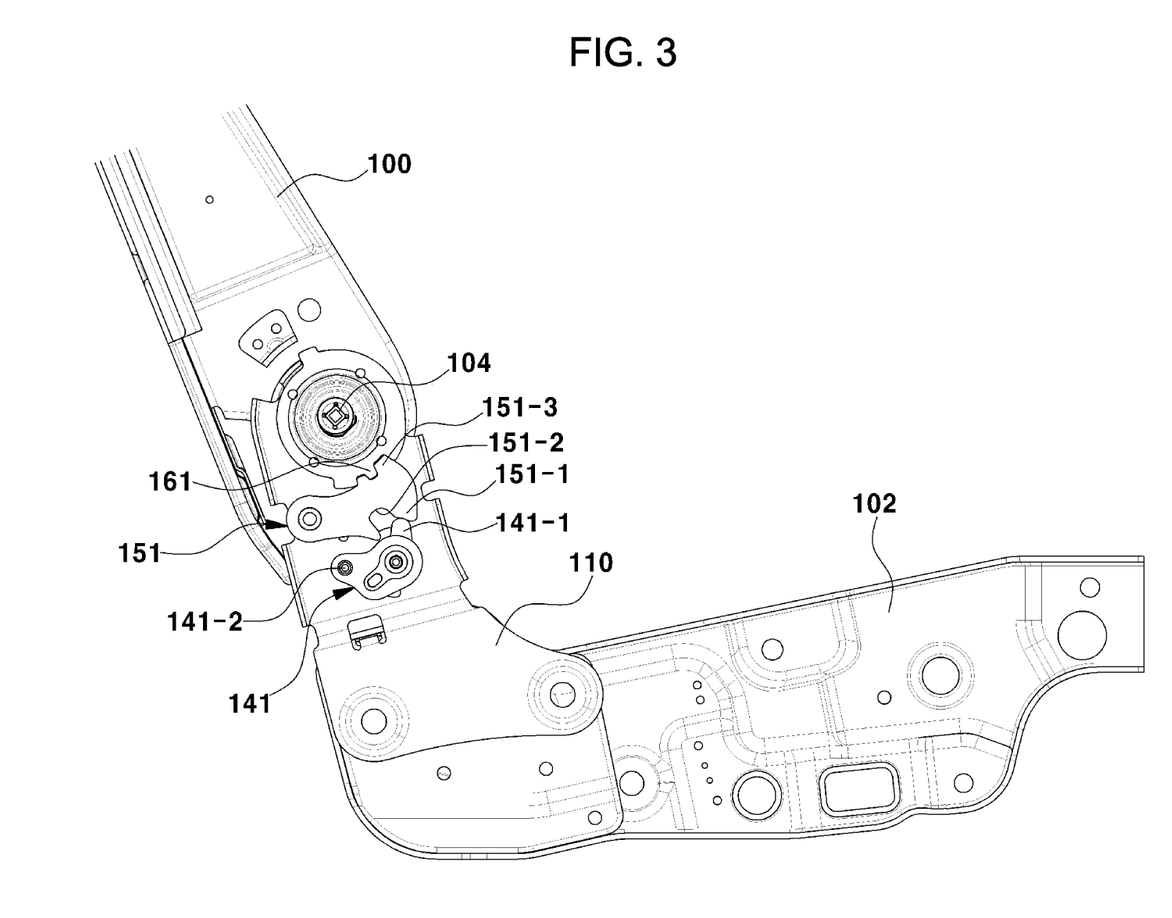
FIG. 3 is a side-sectional view showing a locked state of the conventional seatback-folding mechanism for emergency escape and an unfolded state of a seatback frame.
Figure 4A:
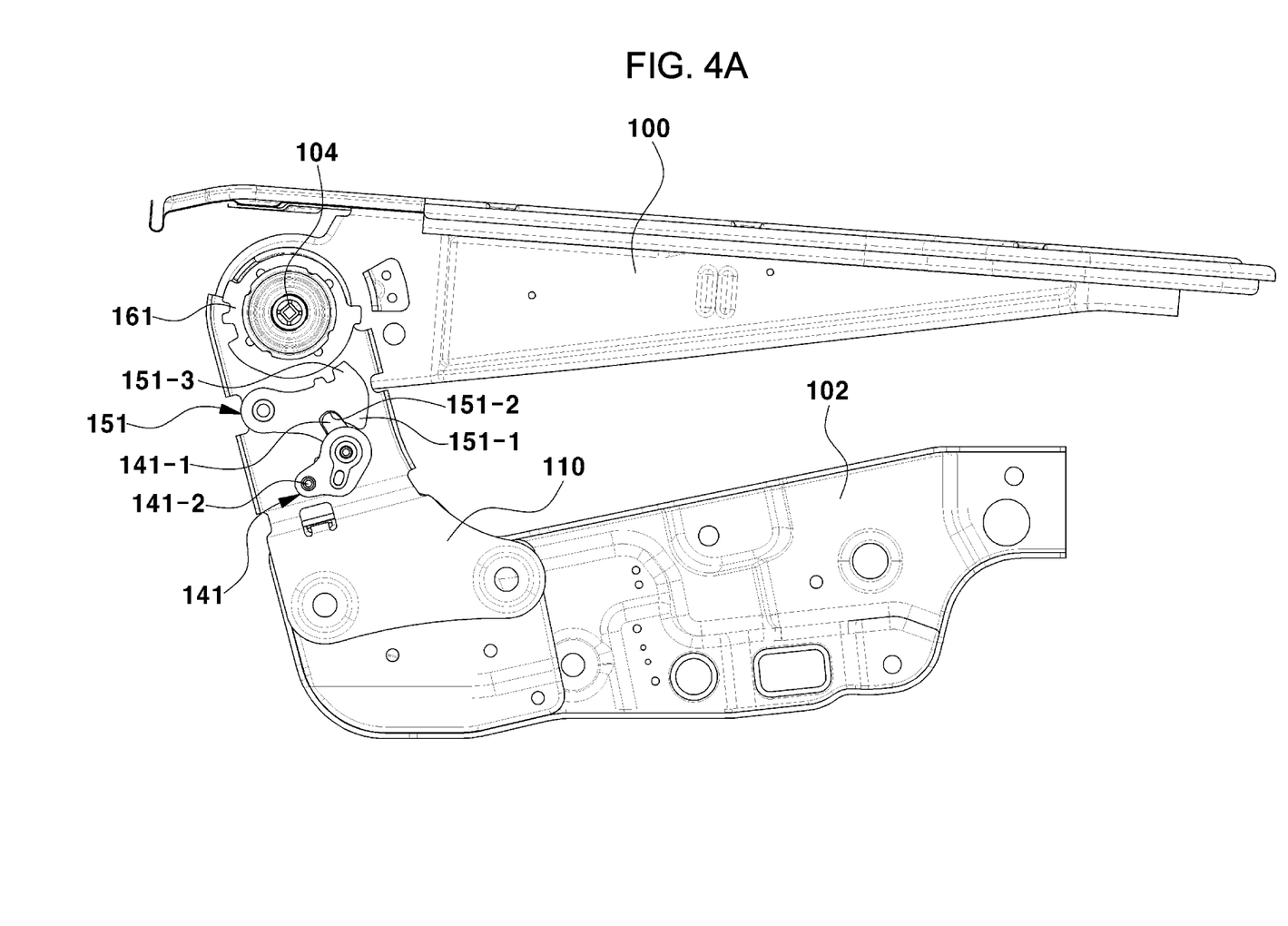
FIGS. 4A and 4B are side-sectional views showing a folded state of a seatback by unlocking operation of the conventional seatback-folding mechanism for emergency escape.
Figure 4B:
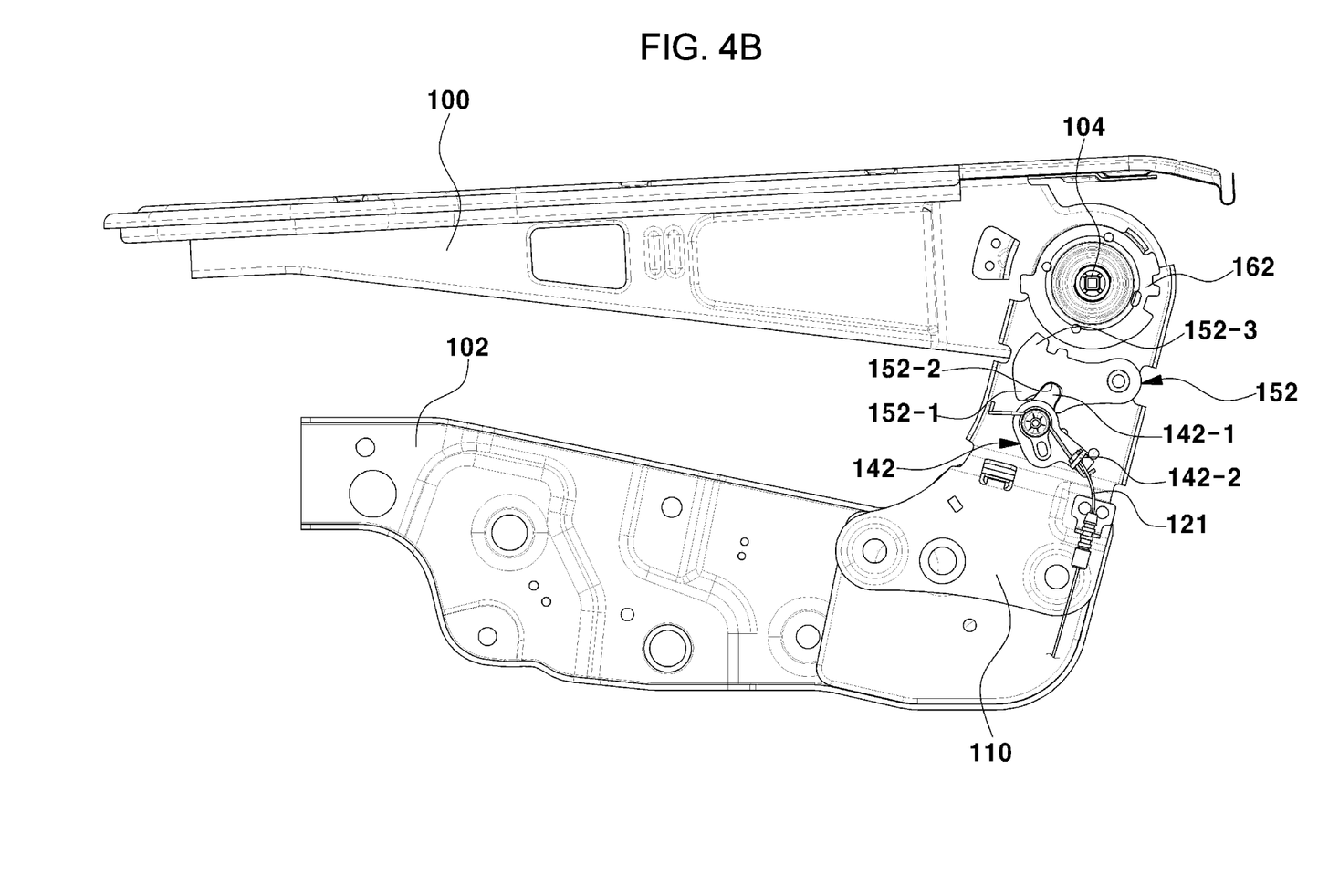

FIGS. 1 and 2 are partial sectional perspective views showing the external appearance of a conventional seatback-folding mechanism for emergency escape, FIG. 3 is a side-sectional view showing an unfolded state of the conventional seatback-folding mechanism for emergency escape when viewed from one side, and FIGS. 4A and 4B are side-sectional views showing a folded state of the conventional seatback-folding mechanism for emergency escape when viewed from one side and an opposite side, respectively.

As shown in FIGS. 1 and 2, a seatback frame 100 is rotatably connected at both lower end portions thereof to a pair of side frames 110 via a shaft 104, and the pair of side frames 110 is connected to a seat cushion frame 102.

A lever 130 is rotatably mounted on the outer surface of one of the pair of side frames 110. The lever 130 includes a rotational force transmission bar 133, a first pull bar 131, and a second pull bar 132, which are spaced apart from each other at predetermined angles.

A strap 120, which is formed to be pulled by an occupant sitting on a third-row seat, is connected to the first pull bar 131 of the lever 130, and a cable 121 is connected at one end thereof to the second pull bar 132 of the lever 130 so as to be pulled.

As shown in FIGS. 2 and 3, a first cam 141, which is connected to the rotational force transmission bar 133 of the lever 130 via a connection pin 141-2, is rotatably mounted on the inner surface of one of the pair of side frames 110. The connection pin 141-2 is movably inserted into a first guide slot 111 formed through the corresponding side frame 110.

In addition, as shown in FIGS. 2 and 3, a first sector gear 161, which is of an externally-toothed type, is mounted on the inner surface of one of the pair of side frames 110. The first sector gear 161 is coupled coaxially to the shaft 104, and a first pawl 151 is rotatably mounted between the first cam 141 and the first sector gear 161.

A locking protrusion 141-1 is integrally formed with the upper portion of the first cam 141. A pushing protrusion 151-1, which pushes the locking protrusion 141-1 upward in a state of being in tight contact therewith, and an unlocking recess 151-2, into which the locking protrusion 141-1 is inserted, are formed in the lower portion of the first pawl 151, and a locking tooth portion 151-3, which is engaged with teeth of the first sector gear 161, is formed at the upper portion of the first pawl 151.

As shown in FIGS. 1 and 4B, a second cam 142, to which the other end of the cable 121 is connected, is rotatably mounted on the inner surface of the other of the pair of side frames 110.

In addition, as shown in FIGS. 1 and 4B, a second sector gear 162, which is coupled coaxially to the shaft 104, is mounted on the inner surface of the other of the pair of side frames 110, and a second pawl 152 is rotatably mounted between the second cam 142 and the second sector gear 162.

A locking protrusion 142-1 is integrally formed with the upper portion of the second cam 142. A pushing protrusion 152-1, which pushes the locking protrusion 142-1 upward in a state of being in tight contact therewith, and an unlocking recess 152-2, into which the locking protrusion 142-1 is inserted, are formed in the lower portion of the second pawl 152, and a locking tooth portion 152-3, which is engaged with teeth of the second sector gear 162, is formed at the upper portion of the second pawl 152.

A cable connection end 142-2, which moves along a second guide slot 112 formed through the corresponding side frame 110, is formed so as to protrude from the outer surface of the second cam 142, and the other end of the cable 121 is connected to the cable connection end 142-2.

In the event of an emergency escape situation, when an occupant sitting on the third-row seat pulls the strap 120, the first pull bar 131 of the lever 130, to which the strap 120 is connected, is pulled, and the lever 130 is rotated in an unlocking direction. At the same time, the second pull bar 132 is also rotated in the unlocking direction, and the cable 121 connected to the second pull bar 132 is pulled in the unlocking direction.

Subsequently, when the lever 130 is rotated in the unlocking direction, the first cam 141, which is connected to the rotational force transmission bar 133 of the lever 130 via the connection pin 141-2, is rotated in the unlocking direction, whereby the locking protrusion 141-1 of the first cam 141 is separated away from the pushing protrusion 151-1 of the first pawl 151 and is displaced to a position capable of insertion into the unlocking recess 151-2 in the first pawl 151.

Subsequently, when the locking protrusion 141-1 of the first cam 141 reaches a position capable of insertion into the unlocking recess 151-2 in the first pawl 151, the first pawl 151 is rotated in a downward direction due to gravity or elastic restoring force of a spring (not shown), whereby the locking protrusion 141-1 is inserted into the unlocking recess 151-2, and the locking tooth portion 151-3 of the first pawl 151 is disengaged from the teeth of the first sector gear 161.

When the cable 121 is pulled in the unlocking direction, the cable connection end 142-2, to which the other end of the cable 121 is connected, is pulled, and thus the second cam 142 is rotated in the unlocking direction, whereby the locking protrusion 142-1 of the second cam 142 is separated away from the pushing protrusion 152-1 of the second pawl 152 and is displaced to a position capable of insertion into the unlocking recess 152-2 in the second pawl 152.

Subsequently, when the locking protrusion 142-1 of the second cam 142 reaches a position capable of insertion into the unlocking recess 152-2 in the second pawl 152, the second pawl 152 is rotated in a downward direction due to gravity or elastic restoring force of a spring (not shown), whereby the locking protrusion 142-1 is inserted into the unlocking recess 152-2, and the locking tooth portion 152-3 of the second pawl 152 is disengaged from the teeth of the second sector gear 162. Consequently, the unlocking process is completed.

In this unlocked state, the seatback frame 100 may be folded forwards together with the first and second sector gears 161 and 162, as shown in FIGS. 4A and 4B, by the occupant pushing the seatback or the spring-back action of a seatback recliner.

In this way, the conventional seatback-folding mechanism enables an occupant sitting on a third-row seat to easily secure an emergency escape route by unlocking and folding the seatback of a second-row seat.

However, the conventional seatback-folding mechanism for emergency escape has the following problems.

First, the conventional seatback-folding mechanism requires a great number of components, such as levers, externally-toothed-type sector gears, pawls, cams, and cables, leading to increase in weight, increase in manufacturing cost, increase in the number of assembly processes, and resultant deterioration in assemblability.

Second, because the components constituting the conventional seatback-folding mechanism should be precisely operated in time series, quality of the components, such as profile precision and dimensional precision of the components, needs to be strictly managed.

Third, when the conventional seatback-folding mechanism is configured to be operated in a motor-driven manner, rather than in a manual manner, there is a problem in that, in the event of a fire, accident, or complete discharge of a battery, the conventional seatback-folding mechanism does not operate due to interruption of the supply of power to the motor, which makes it difficult or impossible for an occupant sitting on a third-row seat to escape quickly from the vehicle in an emergency situation.

The above information disclosed in this Background section is only for enhancement of understanding of the background of the disclosure, and therefore it may contain information that does not form the related art that is already known in this country to a person of ordinary skill in the art.

SUMMARY OF THE DISCLOSURE

The present device has been made in an effort to solve the above-described problems associated with the related art, and it is an object of the present disclosure to provide a seatback-folding device for emergency escape for vehicles, which is equipped with a simply structured mechanism for emergency escape, in which locking operation at the time of unfolding of a seatback of a second-row seat and unlocking operation at the time of folding of the seatback of the second-row seat are performed by ascending/descending of a shaft caused by operation of a lever, thereby not only enabling an occupant sitting on a third-row seat to quickly fold the seatback of the second-row seat and thus to easily secure an emergency escape route, but also reducing the number of components, weight, the number of assembly processes, and manufacturing cost compared to the related art.

In one aspect, the present disclosure provides a seatback-folding device for emergency escape for vehicles, the seatback-folding device including seat cushion side frames having guide holes formed therein so as to have an elongated shape extending in an upward-downward direction, a seatback frame rotatably connected to the side frames via a shaft, an ascending/descending bar inserted at two end portions thereof into the guide holes in the side frames such that the ascending/descending bar is movable upward or downward, a lever connected to one of the two end portions of the ascending/descending bar, and locking plates mounted to the seatback frame and having locking recesses formed in predetermined portions of outer peripheries thereof to allow the two end portions of the ascending/descending bar to be inserted into and locked in the locking recesses.

In a preferred embodiment, the lever may include a front end portion connected to one of the two end portions of the ascending/descending bar and a rear end portion extending in a backward direction to be disposed on the rear surface of a shield cover covering the side frames such that the rear end portion of the lever is movable upward or downward.

In another preferred embodiment, the shield cover may have a lever guide hole formed in the rear surface thereof to allow the rear end portion of the lever to be exposed through the lever guide hole such that the rear end portion is movable upward or downward.

In still another preferred embodiment, when the lever is moved upward, the ascending/descending bar may be moved upward along the guide holes and may be inserted into the locking recesses in the locking plates, and when the lever is moved downward, the ascending/descending bar may be moved downward along the guide holes and may be separated from the locking recesses in the locking plates.

In yet another preferred embodiment, the seatback-folding device may further include an elastic member configured to apply elastic restoring force to the lever and the ascending/descending bar in a direction of being inserted into the locking recesses along the guide holes.

In still yet another preferred embodiment, the elastic member may be implemented as a coil spring including a coil portion placed on the outer circumferential surface of the ascending/descending bar and two end portions fixed to the inner surfaces of the side frames.

In a further preferred embodiment, the seatback-folding device may further include spring-fixing brackets mounted on the inner surfaces of the side frames and configured to fix the two end portions of the coil spring.

Other aspects and preferred embodiments of the present device are discussed infra. The above and other features of the present device are discussed infra.

BRIEF DESCRIPTION OF THE DRAWINGS

The above and other features of the present device will now be described in detail with reference to certain exemplary embodiments thereof illustrated in the accompanying drawings which are given hereinbelow by way of illustration only, and thus are not imitative of the present device, and wherein.

It should be understood that the appended drawings are not necessarily to scale, presenting a somewhat simplified representation of various preferred features illustrative of the basic principles of the present device. The specific design features of the present device as disclosed herein, including, for example, specific dimensions, orientations, locations, and shapes, will be determined in part by the particular intended application and use environment.

In the figures, reference numbers refer to the same or equivalent parts of the present device throughout the several figures of the drawing.

DETAILED DESCRIPTION

Hereinafter, reference will now be made in detail to various embodiments of the present device, examples of which are illustrated in the accompanying drawings and described below.

Figure 5:
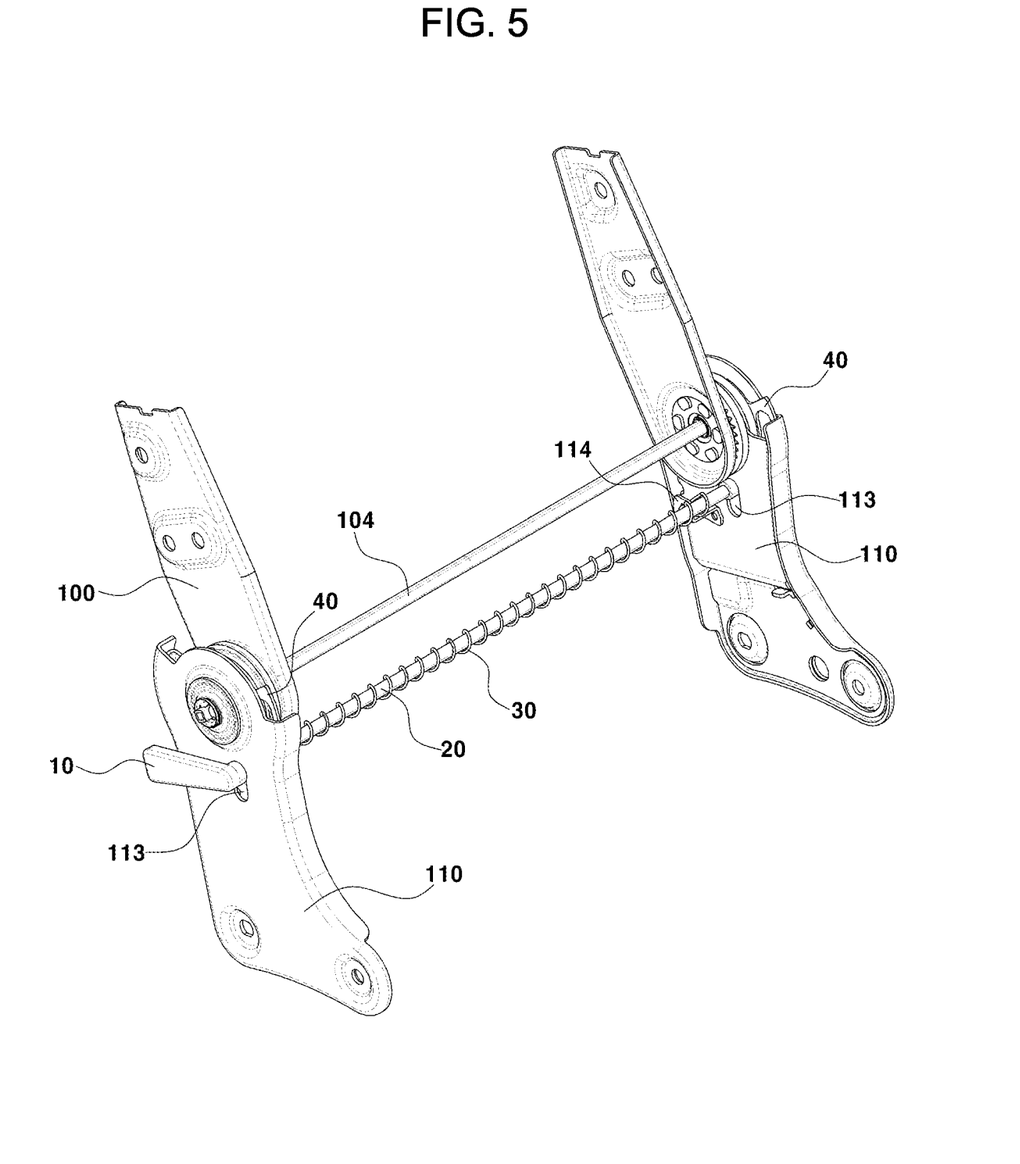
FIG. 5 is a perspective view showing the external appearance of a seatback-folding device for emergency escape for vehicles according to the present disclosure.
Figure 6:
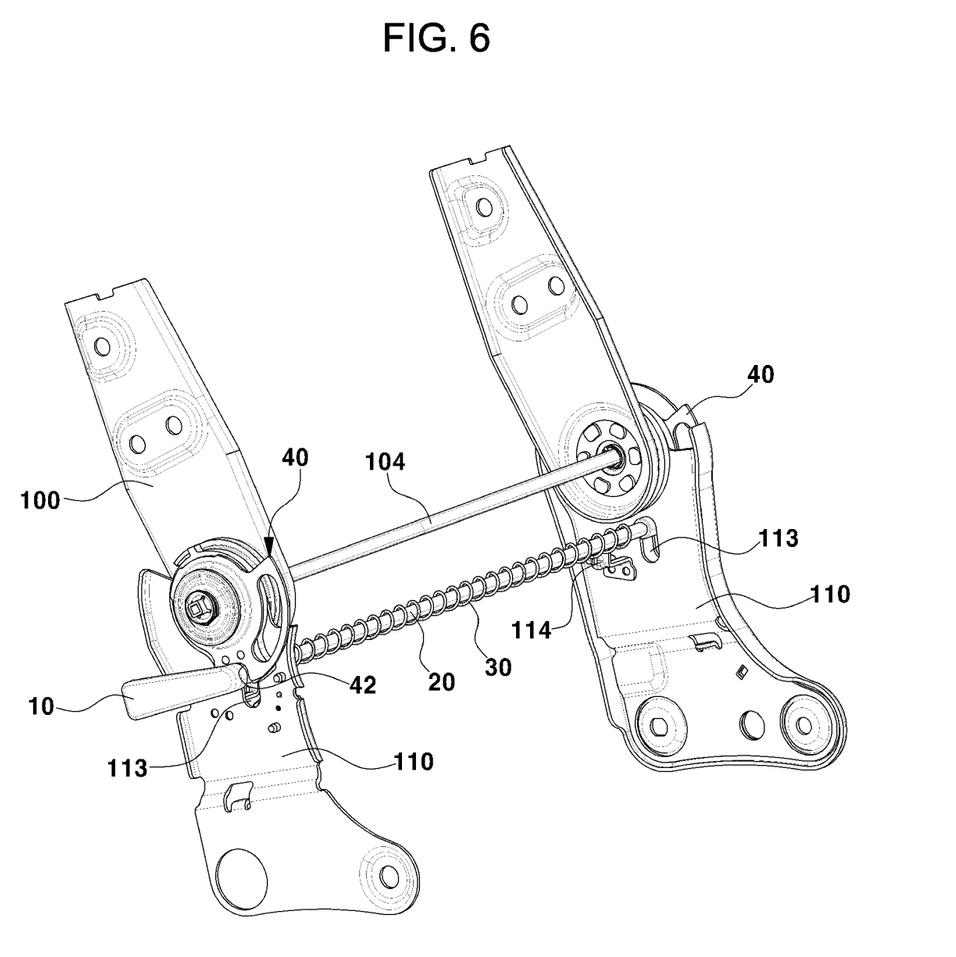
FIG. 6 is a partial sectional perspective view showing a locked state of the seatback-folding device for emergency escape for vehicles according to the present disclosure.

FIG. 5 is a perspective view showing a seatback-folding device for emergency escape for vehicles according to the present disclosure, and FIG. 6 is a partial sectional perspective view showing a locked state of the seatback-folding device for emergency escape for vehicles according to the present disclosure. In the drawings, reference numeral 100 denotes a seatback frame.

The seatback frame 100 is rotatably connected at both lower end portions thereof to a pair of side frames 110 via a shaft 104, and the pair of side frames 110 is connected to a seat cushion frame. Therefore, the seatback frame 100 may be folded forwards by rotation of the shaft 104.

Guide holes 113, which extend in an upward-downward direction and have an elongated hole shape, are formed through the side frames 110.

An ascending/descending bar 20, which has a pipe shape, is inserted at both end portions thereof into the guide holes 113 formed through the side frames 110.

In addition, locking plates 40 each having a locking recess 42 formed therein are mounted on the outer surfaces of both lower end portions of the seatback frame 100.

In detail, each of the locking plates 40 is structured such that the locking recess 42 is formed in a predetermined portion of the outer periphery thereof to allow a respective one of both end portions of the ascending/descending bar 20 to be inserted thereinto and locked therein, and is mounted on the outer surface of a respective one of both lower end portions of the seatback frame 100. Accordingly, when the seatback frame 100 is folded or unfolded, the locking plates 40 are rotated in a folding direction or an unfolding direction.

When the seatback frame 100 is located at a position prior to folding, i.e., an unfolded position, the locking recesses 42 in the locking plates 40 are aligned with the guide holes 113 in the side frames 110 in the upward-downward direction. In this state, both end portions of the ascending/descending bar 20 may be moved upward along the guide holes 113 and may be inserted into and locked in the locking recesses 42.

A lever 10, which is manually operated by an occupant so as to move upward or downward, is connected to one of both end portions of the ascending/descending bar 20. The front end portion of the lever 10 is connected to one end portion of the ascending/descending bar 20, and the rear end portion of the lever 10 extends in the backward direction and is exposed through the rear surface of a shield cover 50 covering the side frames 110 so as to be moved upward or downward by manipulation by the occupant, as shown in FIG. 9.

The shield cover 50 is a kind of decorative covering member that covers side frames of a seat cushion and other internal components of a seat in order to shield the same from the outside, and various switches for adjustment of position of a seat are mounted to the shield cover 50.

Figure 9:
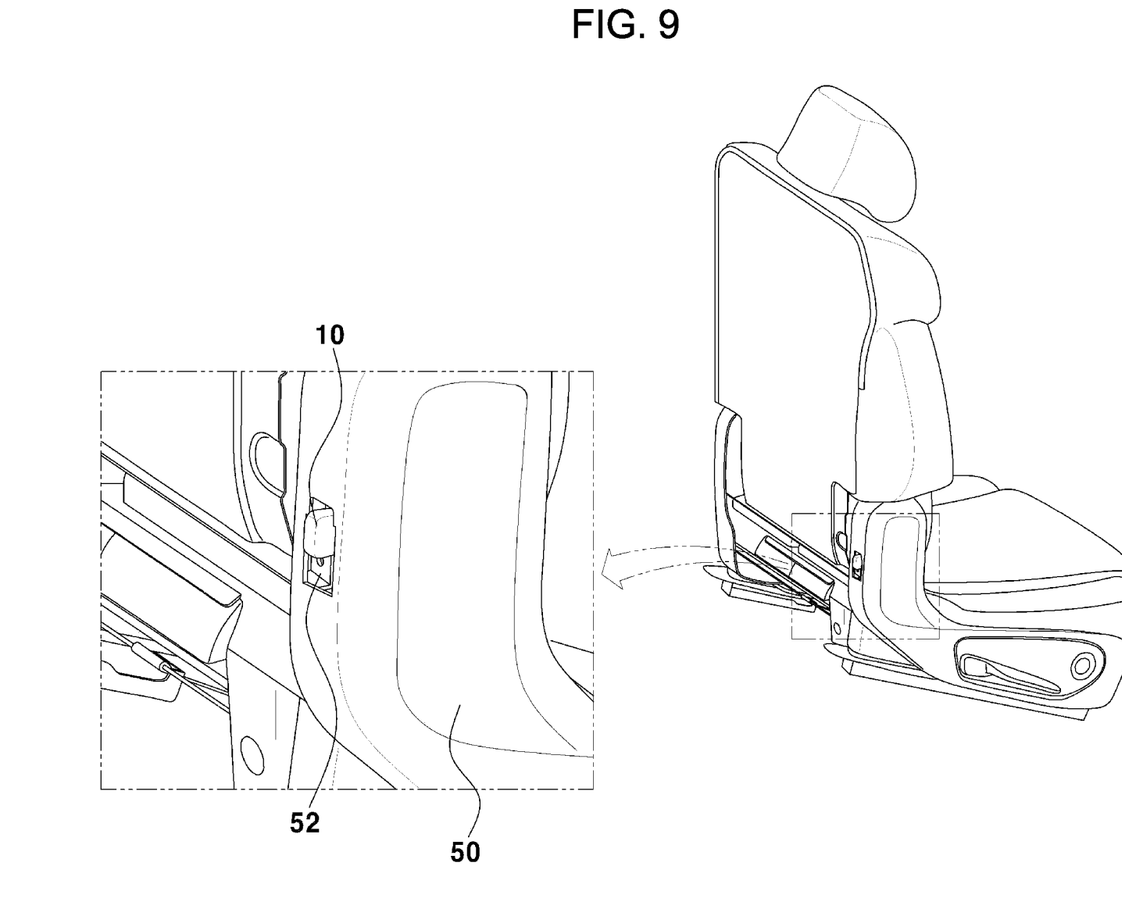
FIG. 9 is a perspective view showing a state in which a lever of the seatback-folding device for emergency escape for vehicles according to the present disclosure is exposed through a shield cover so as to be operable.

Preferably, as can be seen from FIG. 9, a lever guide hole 52 is formed in the rear surface of the shield cover 50 to allow the rear end portion of the lever 10 to be exposed therethrough so as to be moved upward or downward by the occupant. The occupant may grab the rear end portion of the lever 10 to move the lever 10 upward or downward along the lever guide hole 52.

In the state in which the seatback frame 100 is located at a position prior to folding, i.e., an unfolded position, when the occupant grabs and moves the lever 10 upward, both end portions of the ascending/descending bar 20 may be moved upward along the guide holes 113 and may be inserted into the locking recesses 42 in the locking plates 40. On the other hand, when the occupant grabs and moves the lever 10 downward, both end portions of the ascending/descending bar 20 may be moved downward along the guide holes 113 and may be separated from the locking recesses 42 in the locking plates 40.

The seatback-folding device for emergency escape according to the present disclosure further includes an elastic member configured to apply elastic restoring force to the lever 10 and the ascending/descending bar 20 in a direction of being inserted into the locking recesses 42 along the guide holes 113 in the side frames 110.

Preferably, the elastic member may be implemented as a coil spring 30, a coil portion of which is placed on the outer circumferential surface of the ascending/descending bar 20 and both end portions of which are fixed to the inner surfaces of the side frames 110.

More preferably, both end portions of the coil spring 30 may be fixed to spring-fixing brackets 114 mounted on the inner surfaces of the side frames 110.

Figure 7:
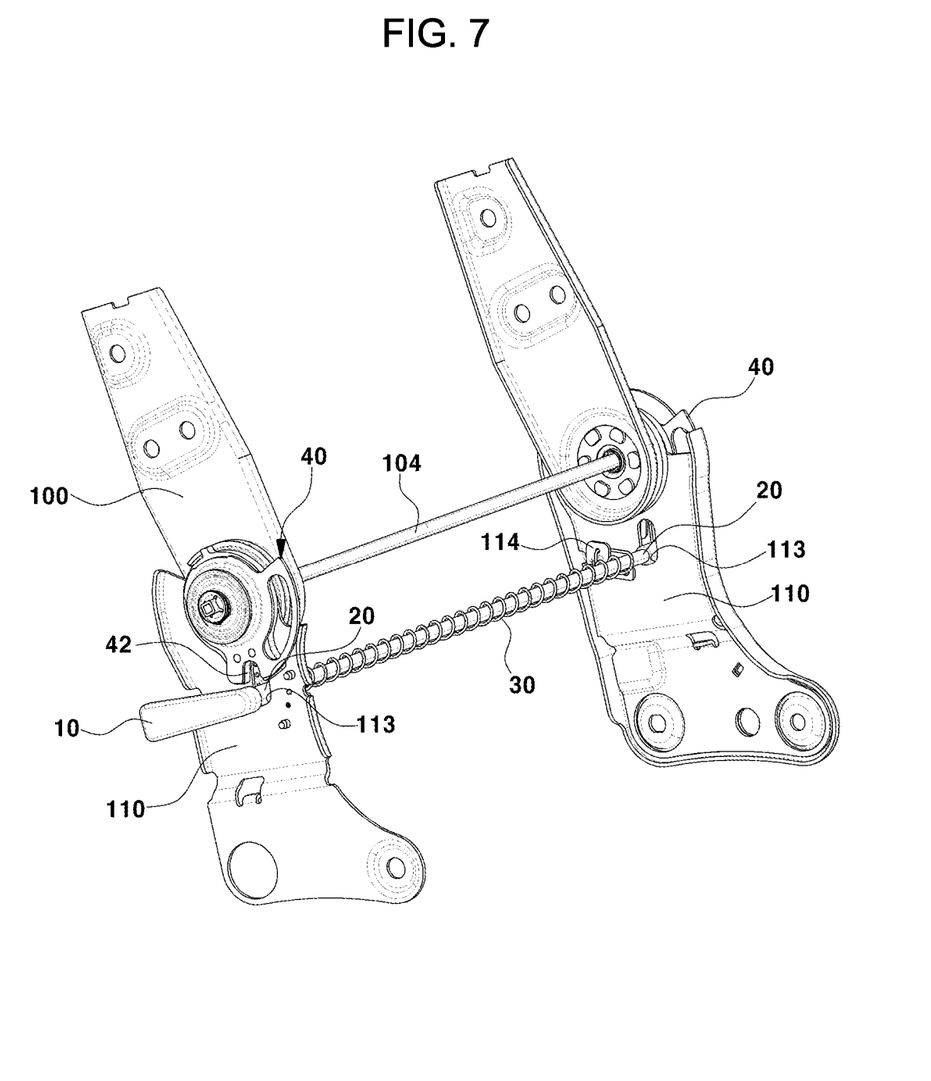
FIG. 7 is a partial sectional perspective view showing an unlocked state of the seatback-folding device for emergency escape for vehicles according to the present disclosure.

When the occupant grabs and moves the lever 10 downward and thus the ascending/descending bar 20 connected to the lever 10 is separated from the locking recesses 42 in the locking plates 40 and is moved downward along the guide holes 113 in the side frames 110, the coil spring 30 placed on the ascending/descending bar is expanded. The expanded coil spring 30 exerts elastic restoring force so that the ascending/descending bar 20 is moved upward along the guide holes 113 to be inserted back into the locking recesses 42 in the locking plates 40.

Hereinafter, operation of the seatback-folding device for emergency escape according to the present disclosure configured as described above will be described.

Figure 8:
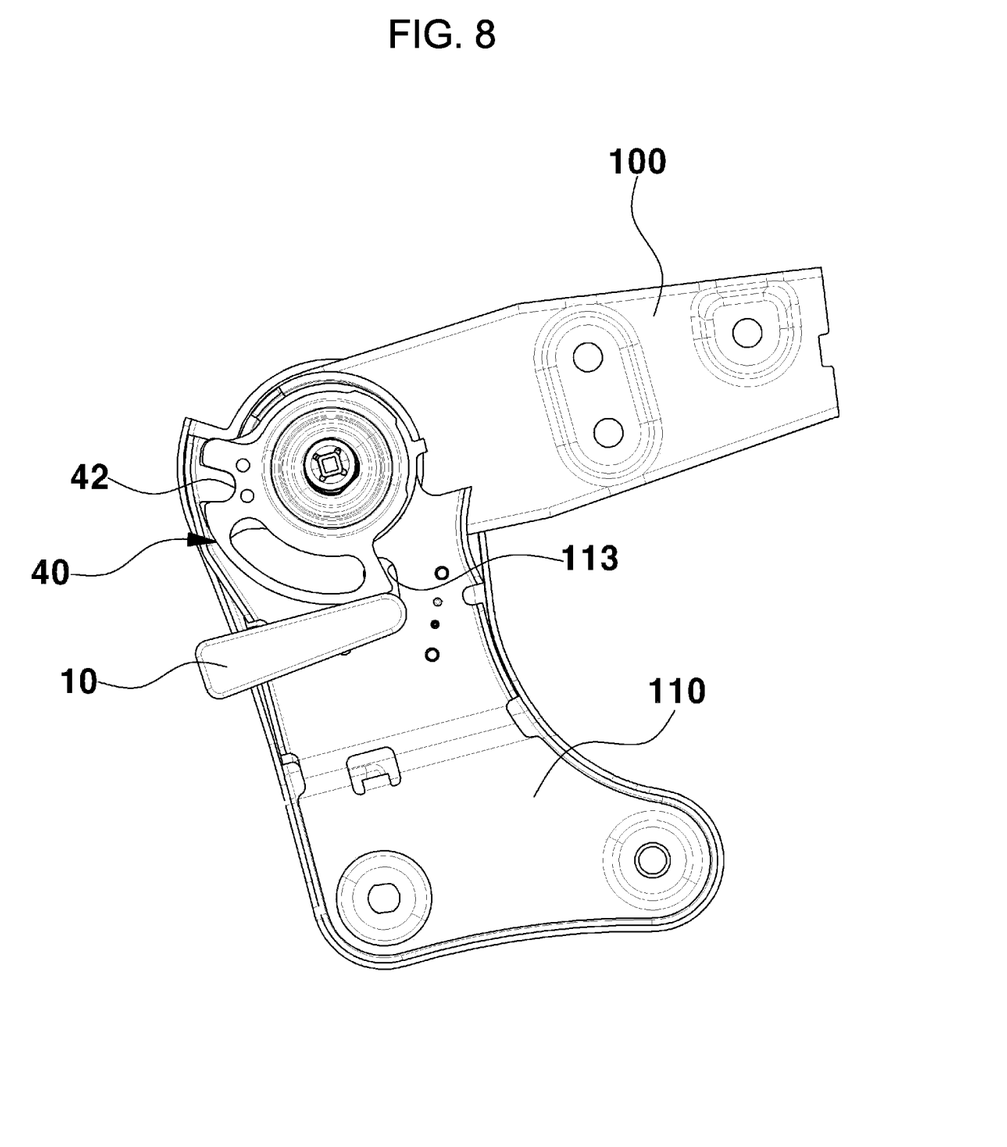
FIG. 8 is a side view showing a folded state of a seatback frame of a second-row seat by operation of the seatback-folding device for emergency escape for vehicles according to the present disclosure.

FIG. 7 is a partial sectional perspective view showing an unlocked state of the seatback-folding device for emergency escape for vehicles according to the present disclosure, and FIG. 8 is a perspective view showing a folded state of a seatback frame of a second-row seat by operation of the seatback-folding device for emergency escape according to the present disclosure.

As can be seen from FIG. 6, when the seatback frame 100 is located at a position prior to folding, i.e., an unfolded position, the ascending/descending bar 20 is maintained in a state of being inserted into the locking recesses 42 in the locking plates 40 along the guide holes 113 in the side frames 110 by the elastic restoring force of the coil spring 30.

Rotation of the locking plates 40 mounted on the outer surface of the seatback frame 100 is restricted by insertion of the ascending/descending bar 20 into the locking recesses 42 in the locking plates 40. Accordingly, the seatback frame 100, which is integrated with the locking plates 40, may be maintained in a state prior to folding, i.e., an unfolded state.

In an emergency escape situation, when an occupant sitting on a third-row seat grabs and moves the lever 10 downward, the ascending/descending bar 20 connected to the lever 10 is moved downward along the guide holes 113 in the side frames 110 and is separated from the locking recesses 42 in the locking plates 40, as shown in FIG. 7.

Since both end portions of the ascending/descending bar 20 are separated from the locking recesses 42 in the locking plates 40, the locking plates 40 are unlocked, and the seatback frame 100, which is integrated with the locking plates 40, becomes rotatable to be folded forwards.

Subsequently, as shown in FIGS. 4A and 4B, the seatback frame 100 may be folded forwards together with the locking plates 40 by action of pushing the seatback by the occupant sitting on the third-row seat or the spring-back action of a seatback recliner.

In this way, the occupant sitting on the third-row seat may easily secure an emergency escape route by unlocking and folding the seatback of the second-row seat using the seatback-folding mechanism according to the present disclosure.

As described above, according to the present disclosure, locking operation at the time of unfolding of the seatback of the second-row seat and unlocking operation at the time of folding of the seatback of the second-row seat are performed by ascending/descending of the shaft caused by operation of the lever. Therefore, the occupant sitting on the third-row seat may easily secure an emergency escape route. Further, the number of components, weight, the number of assembly processes, and manufacturing cost may be reduced compared to a conventional mechanism.

As is apparent from the above description, the seatback-folding device for emergency escape for vehicles according to the present disclosure has the following effects.

First, locking operation at the time of unfolding of a seatback of a second-row seat and unlocking operation at the time of folding of the seatback of the second-row seat are performed by ascending/descending of a shaft caused by operation of a lever, thereby making it possible for an occupant sitting on a third-row seat to quickly fold the seatback of the second-row seat and thus to easily secure an emergency escape route and making it possible to reduce the number of components, weight, the number of assembly processes, and manufacturing cost compared to a conventional seatback-folding mechanism for emergency escape.

Second, since the seatback-folding mechanism for emergency escape according to the present disclosure has a simple structure in which ascending/descending of the shaft is performed by operation of the lever, it is possible to relax quality control of the components, such as operational precision, profile precision, and dimensional precision of the components, thus improving the productivity thereof compared to a conventional mechanism having a great number of complicated components.

The present device has been described above with reference to an exemplary embodiment. The embodiment described in the specification and shown in the accompanying drawings is illustrative only and is not intended to represent all aspects of the present device. Therefore, the present device is not limited to the embodiment presented herein, and it is to be understood by those skilled in the art that various modifications or changes can be made without departing from the technical spirit or scope of the present device as disclosed in the appended claims.

What is claimed is:

1. A seatback-folding device for emergency escape for vehicles, the seatback-folding device comprising:
   seat cushion side frames including guide holes formed therein so as to have an elongated shape in an upward-downward direction;
   a seatback frame rotatably connected to the side frames via a shaft;
   an ascending/descending bar configured to be inserted at two end portions thereof into the guide holes in the side frames such that the ascending/descending bar is movable upward or downward;
   a lever connected to one of the two end portions of the ascending/descending bar; and
   locking plates including locking recesses formed in predetermined portions of outer peripheries thereof to allow the two end portions of the ascending/descending bar to be inserted into and locked in the locking recesses, the locking plates being mounted to the seatback frame.

2. The seatback-folding device of claim 1, wherein the lever comprises a front end portion connected to one of the two end portions of the ascending/descending bar and a rear end portion extending in a backward direction to be disposed on a rear surface of a shield cover configured to cover the side frames such that the rear end portion of the lever is movable upward or downward.

3. The seatback-folding device of claim 2, wherein the shield cover includes a lever guide hole formed in the rear surface thereof to allow the rear end portion of the lever to be exposed through the lever guide hole such that the rear end portion is movable upward or downward.

4. The seatback-folding device of claim 1, wherein, when the lever is moved upward, the ascending/descending bar is configured to be moved upward along the guide holes and is inserted into the locking recesses in the locking plates, and
   wherein, when the lever is moved downward, the ascending/descending bar is configured to be moved downward along the guide holes and is separated from the locking recesses in the locking plates.

5. The seatback-folding device of claim 1, further comprising an elastic member configured to apply elastic restoring force to the lever and the ascending/descending bar in a direction whereby the two end portions of the ascending/descending bar are inserted into the locking recesses along the guide holes.

6. The seatback-folding device of claim 5, wherein the elastic member is implemented as a coil spring comprising a coil portion configured to be placed on an outer circumferential surface of the ascending/descending bar and two end portions fixed to inner surfaces of the side frames.

7. The seatback-folding device of claim 6, further comprising spring-fixing brackets mounted on the inner surfaces of the side frames and configured to fix the two end portions of the coil spring.

8. A seatback-folding device for emergency escape for vehicles, the seatback-folding device comprising:
   seat cushion side frames including guide holes formed therein so as to have an elongated shape extending in a first direction and a second direction opposite the first direction;
   a seatback frame rotatably connected to the side frames via a shaft;
   an ascending/descending bar configured to be inserted at two end portions thereof into the guide holes in the side frames such that the ascending/descending bar is movable in the first direction or in the second direction;
   a lever connected to one of the two end portions of the ascending/descending bar; and
   locking plates including locking recesses formed in predetermined portions of outer peripheries thereof to allow the two end portions of the ascending/descending bar to be inserted into and locked in the locking recesses, the locking plates being mounted to the seatback frame.

9. The seatback-folding device of claim 8, wherein the lever comprises a front end portion connected to one of the two end portions of the ascending/descending bar and a rear end portion extending in a backward direction to be disposed on a rear surface of a shield cover configured to cover the side frames such that the rear end portion of the lever is movable in the first direction or in the second direction.

10. The seatback-folding device of claim 9, wherein the shield cover includes a lever guide hole formed in the rear surface thereof to allow the rear end portion of the lever to be exposed through the lever guide hole such that the rear end portion is movable in the first direction or in the second direction.

11. The seatback-folding device of claim 8, wherein, when the lever is moved in the first direction, the ascending/descending bar is configured to be moved in the first direction along the guide holes and is inserted into the locking recesses in the locking plates, and
   wherein, when the lever is moved in the second direction, the ascending/descending bar is configured to be moved in the second direction along the guide holes and is separated from the locking recesses in the locking plates.

12. The seatback-folding device of claim 8, further comprising an elastic member configured to apply elastic restoring force to the lever and the ascending/descending bar in a direction whereby the two end portions of the ascending/descending bar are inserted into the locking recesses along the guide holes.

13. The seatback-folding device of claim 12, wherein the elastic member is implemented as a coil spring comprising a coil portion configured to be placed on an outer circumferential surface of the ascending/descending bar and two end portions fixed to inner surfaces of the side frames.

14. The seatback-folding device of claim 13, further comprising spring-fixing brackets mounted on the inner surfaces of the side frames and configured to fix the two end portions of the coil spring.

15. The seatback-folding device of claim 8, wherein the first direction is upward and the second direction is downward.

* * * * *